(12) United States Patent
Chang (10) Patent No.: US 12,369,681 B2
(45) Date of Patent: Jul. 29, 2025

(54) ADHESIVE COMPOSITE

(71) Applicant: Worthen Industries, Nashua, NH (US)

(72) Inventor: Bob Y. Chang, Nashua, NH (US)

(73) Assignee: Worthen Industries, Nashua, NH (US)

( * ) Notice: Subject to any disclaimer, the term of this patent is extended or adjusted under 35 U.S.C. 154(b) by 49 days.

(21) Appl. No.: 18/331,242

(22) Filed: Jun. 8, 2023

(65) Prior Publication Data

US 2023/0309650 A1    Oct. 5, 2023

Related U.S. Application Data

(63) Continuation of application No. PCT/US2020/064717, filed on Dec. 12, 2020.

(51) Int. Cl.
| A43B 13/12 | (2006.01) |
| A43B 13/04 | (2006.01) |
| C09J 175/04 | (2006.01) |

(52) U.S. Cl.
CPC .......... A43B 13/122 (2013.01); A43B 13/04 (2013.01); C09J 175/04 (2013.01)

(58) Field of Classification Search
CPC ....... A43B 13/04; A43B 13/12; A43B 13/122; A43B 13/14; A43B 13/28; C09J 175/04; C08L 75/04; C08G 2170/90; B29D 35/10
See application file for complete search history.

(56) References Cited

U.S. PATENT DOCUMENTS

| 4,676,010 A | 6/1987 | Cheskin |
| 5,786,057 A | 7/1998 | Lyden |
| 6,041,520 A | 3/2000 | Aoki |
| 7,200,955 B2 | 4/2007 | Foxen |
| 8,312,644 B2 | 11/2012 | Peikert |
| 8,713,819 B2 | 5/2014 | Auger |
| 2002/0178612 A1 | 12/2002 | Tsen |
| 2005/0229431 A1 | 10/2005 | Gerlin |
| 2008/0206513 A1 | 8/2008 | Malz |
| 2011/0088288 A1 | 4/2011 | Park |
| 2011/0113655 A1 | 5/2011 | Polegato Moretti |

(Continued)

FOREIGN PATENT DOCUMENTS

| WO | 2015028045 | 3/2015 |
| WO | 2017072202 | 5/2017 |

OTHER PUBLICATIONS

Written Opinion for WO2022125119.*

*Primary Examiner* — Sonya M Sengupta
(74) *Attorney, Agent, or Firm* — Lambert Shortell & Connaughton; David J. Connaughton, Jr.; Justin P. Tinger (57) ABSTRACT

An adhesive composition for use in a shoe outsole assembly, and methods of forming the same are provided. In one aspect, the adhesive composition has a fabric layer with an adhesive applied to a top surface. In another aspect, the adhesive composition has a fabric layer with a barrier layer applied to a top surface, and an adhesive is applied to the barrier layer opposite to the fabric layer. The shoe outsole formed using the adhesive composition has the fabric material directly bonded with the outsole material such that the outsole material partially penetrates into the fabric. An adhesive is applied to the opposite side of the fabric or to the optional barrier layer which is on the opposite side of the fabric. This adhesive may then be used to bond the outsole to a shoe, such as a shoe upper, shoe midsole, and the like.

5 Claims, 9 Drawing Sheets

(56) References Cited

U.S. PATENT DOCUMENTS

| | | |
|---|---|---|
| 2011/0173839 A1 | 7/2011 | Sing |
| 2011/0252671 A1 | 10/2011 | Maron |
| 2013/0291409 A1 | 11/2013 | Reinhardt |
| 2016/0136910 A1* | 5/2016 | Krajcir .................. A43B 13/04 12/146 B |
| 2017/0027281 A1* | 2/2017 | Liang .................. A43B 23/026 |
| 2023/0309650 A1* | 10/2023 | Chang .................. B29D 35/10 36/25 R |

* cited by examiner

ADHESIVE COMPOSITE

BACKGROUND

Technical Field

The present disclosure relates generally to rubber shoe outsole composites. More particularly the present disclosure relates to an adhesive composite operable to, in certain embodiments, form a composite of a rubber shoe outsole and a fabric such as a nonwoven fabric bonded directly to the rubber shoe outsole allowing attachment of the composite to a variety of different substrates via an adhesive.

Description of Related Art

When assembling shoes, often an outsole of the shoe must be attached to an upper. In many cases, the outsole is adhered to the upper and/or to a midsole which is in turn attached to the upper. Natural and synthetic rubbers are a very common material of which shoe outsoles are made. For uppers and midsoles, a wide variety of materials may be used. Some of these materials are more compatible with adhesives which will bind to rubber than others. For example, ethylene-vinyl acetate (EVA) is well known to be difficult to adhere to rubber, especially with an environmentally friendly water-based adhesive, because of the different properties between EVA and rubber. Rubber, such as SBR rubber, is nonpolar, while EVA is polar. Because of these different properties, many adhesive do not bond well to both. Many other materials face similar issues, making bonding of rubber to the upper/midsole challenging, particularly without the use of polluting and toxic solvent based adhesives.

Moreover, even for upper and midsole materials which do bond well with rubber, not all adhesives work equally well with one upper/midsole material to another. Accordingly, outsole/midsole/upper combinations will have different sets of acceptable adhesives depending on the compositions of each of the outsole/midsole/upper. This leads to a large number of variations and material selections, leading to inefficiencies, sourcing challenges, excess storage space, and the like.

Therefore, what is needed is an adhesive composite which can be used to form a rubber outsole composition which allows for easy adhesion to a wide variety of materials.

SUMMARY

The subject matter of this application may involve, in some cases, interrelated products, alternative solutions to a particular problem, and/or a plurality of different uses of a single system or article.

In one aspect, a method of forming a rubber outsole composite is provided. The method involves placing a quantity of rubber in a mold, and then positioning a fabric material on top of the rubber in the mold. In some embodiments, fabric material may be cut or shaped so as to have a perimeter shape matching the perimeter outline of the mold. The rubber is then vulcanized in the mold with the fabric material in the mold. This causes the rubber to seep or otherwise permeate into the fabric and then during vulcanization, the rubber is bonded directly to the fabric without the need for adhesive or other bonding material to hold the two elements together. On an opposite side of the fabric, an adhesive may be applied directly to the fabric or to a barrier layer bonded to the fabric opposite to the out sole. The adhesive may then be used to bond the outsole to a shoe upper or midsole.

In another aspect, a shoe outsole assembly is provided. The shoe outsole assembly is formed as a shoe outsole formed of a rubber or similar material. A fabric material is directly bonded to the shoe outsole. This direct bonding occurs by the outsole material permeating at least partially into the fabric, and then being vulcanized or otherwise cured or hardened. As such, no adhesive is present between the fabric and outsole.

In yet another aspect, shoes having the outsoles contemplated herein are also provided.

DETAILED DESCRIPTION

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Generally, the present disclosure concerns a shoe outsole having a fabric, such as a non-woven fabric bonded to a top surface. An adhesive, typically a water based adhesive, can be applied to the fabric and the outsole can be bonded to a midsole or upper. The bonded fabric of the outsole eliminates the need for complex systems capable of bonding rubber outsoles to dissimilar materials, such as EVA, because the adhesive is able to physically bond with the fabric instead. The porous nature of the fabric makes it nearly universally acceptable to adhesives, allowing the adhesive to "grab" the fabric and cure/solidify thereto. This also allows for a rubber and fabric composite to be "universal" in that it can be attached to any variety of upper and midsole materials via whatever adhesive/chemistry best suits the particular upper/midsole. This will increase operational efficiencies as a plant will need fewer different adhesives/materials to bond the outsole to different substrates.

In other aspects, the present disclosure concerns an adhesive composition formed of a fabric layer having an adhesive extruded onto a top surface of the fabric layer. This composition can then be bonded to a rubber material such as a shoe outsole. In another similar aspect, the present disclosure concerns an adhesive composition formed of a fabric layer having a barrier layer extruded onto a top surface of the fabric layer. This composition can then be bonded to a rubber material such as a shoe outsole. An adhesive can then be applied to the barrier layer, either before vulcanization or other bonding of the rubber to the fabric layer, or after.

In many embodiments, the nonwoven fabric is directly bonded to the rubber during a vulcanization/curing process. This forms a direct physical connection of the outsole material by its partially penetrating into the fabric and curing. The term "directly bonded" is used throughout this disclosure to mean that a material, such as the outsole and/or a barrier material at least partially penetrate the fabric and then cure, solidify, vulcanize and/or harden, thus holding onto the fabric by the hardened material engaged with the fabric. This structure avoids the need for an adhesive between fabric and outsole. By avoiding this adhesive and direct bonding, a manufacturing step can be skipped, and material and labor costs are reduced. In a particular embodiment, the nonwoven fabric may be cut to a determined shape, and placed into a mold with the outsole material for vulcanization or curing.

In such embodiment, the outsole and fabric composites may be made well in advance and even separate from the point of assembly into a shoe, because the direct bonding of the rubber and fabric will not deteriorate over time or environmental conditions. In one embodiment, the adhesive may be extruded on to the fabric before bonding to the outsole. In another embodiment, adhesive may be applied at any point after the outsole-fabric composite is formed for assembly into the shoe.

In some embodiments, a barrier material such as a plastic may be bonded to a top side of the fabric opposite to the outsole. The barrier material may prevent the rubber outsole material from seeping through the fabric and saturating the fabric, which will interfere with the ability of an adhesive to bond to the opposite side of the fabric. The barrier material may be any continuous material which can prevent passage of the rubber through fabric or around the fabric. Passage or seepage of the rubber through the fabric may interfere with the adhesive—both in its ability to bond to the fabric and by fouling the adhesive for bonding to the midsole/upper. It may also be somewhat resilient to aid in proper placement of the fabric over the rubber prior to vulcanization/curing. In most cases, the barrier material will be a high melt temperature plastic, such as high melt temperature thermoplastic polyurethane. These materials can be placed into the mold with the rubber outsole material and fabric and withstand the vulcanization process without damage.

In embodiments with a barrier, adhesive may be applied to the barrier layer and in turn adhered to the upper/midsole. Barrier material, such as thermoplastic polyurethane ("TPU") will be selected to be compatible with the adhesive used to bond the outsole to the particular upper or midsole. These embodiments having the barrier may be used in the same way as disclosed herein as the embodiments having only the outsole and fabric layer. In one embodiment, the barrier material may be extruded onto the fabric layer. In a further embodiment, an adhesive may be extruded onto the opposite side of the barrier from the fabric layer, forming a three layer composite, either at the same time as the extrusion of the barrier, or at a different time. In either case of extrusion, the fabric composite may then be included in a mold with the outsole during vulcanization/curing to bond the fabric to the outsole material. It should be understood that in all embodiments disclosed herein, such barriers may be used on an opposite side of the fabric layer to separate fabric from adhesive.

In many instances, a release liner is applied to the adhesive, during or after the adhesive application to the fabric or barrier layer. The release liner operates to protect the adhesive from fouling and/or premature adhesion.

The fabric contemplated for use herein may be any fabric capable of being bonded to the rubber material and capable of withstanding the vulcanization or other curing process. In many embodiments, a non-woven fabric is used, but this is not necessarily required and woven or knit fabrics may also be used. In one embodiment, the non-woven fabric is spunlace hydroentangled polyester.

The present disclosure is particularly useful in conjunction with water based adhesives, which are preferable due to their lack of volatile organic compounds (VOCs), low toxicity, favorability to worker health, and environmental friendliness. While any adhesive may be used, including solvent based and others, examples of adhesives which may be used herein include, but are not limited to thermoplastic urethane ("TPU") and ethylene vinyl acetate ("EVA") copolymers, among others. In one embodiment, for a midsole/upper receptive to TPU adhesion, the adhesive may be a TPU adhesive. For a midsole/upper of EVA or other polyolefinic surfaces, an EVA copolymer based adhesive may be used. Of course, other adhesives may be used without straying from the scope of this invention.

The term rubber is used herein generally to refer to both natural and synthetic rubbers and polymer materials having similar rubber properties used for the outsoles of shoes. The inventions disclosed may also be applicable to other outsole materials, for example EVA, PVC, urethane, and the like.

As noted, the rubber composite system is widely applicable to any number of shoe uppers/midsoles, and other substrates in general. Typical materials which the outsole composition may be bonded include, but are not limited to polyurethane, leather, fabric, polyvinyl chloride, and urethanes.

Figure 1:
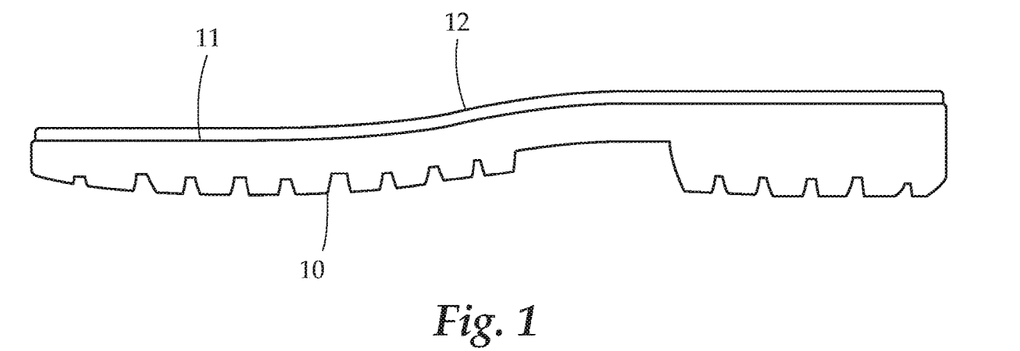
FIG. 1 provides a view of one embodiment of the present disclosure.
Figure 3:
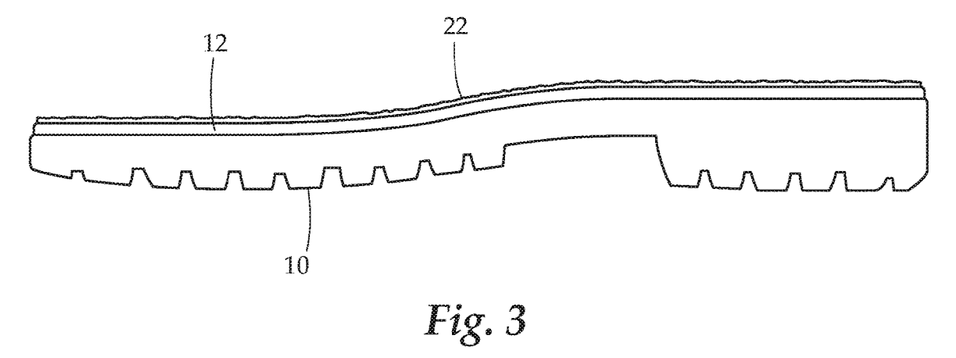
FIG. 3 provides a view of yet another embodiment of the present disclosure.

Turning now to FIG. 1, a side view of an embodiment of the composite is provided. In this view, a rubber outsole 10 for a shoe or other footwear has a nonwoven material 12 bonded with the rubber at its top surface 11. In this view, the rubber outsole 10 forms a continuous surface, and this continuous surface embodiment may apply to all other disclosed embodiments. However, the outsole 10 need not be continuous in all embodiments, and instead may have openings or spacings, depending on design and tread needs. The rubber top surface 11 has penetrated into the void spaces in the nonwoven material 12 prior to vulcanization of the rubber, and as such is directly bonded with the nonwoven material 12 without the use of an adhesive. FIG. 3 provides a view of the composite of FIG. 1 having an adhesive material 22 applied to the top surface of the nonwoven fabric 12.

Figure 2:
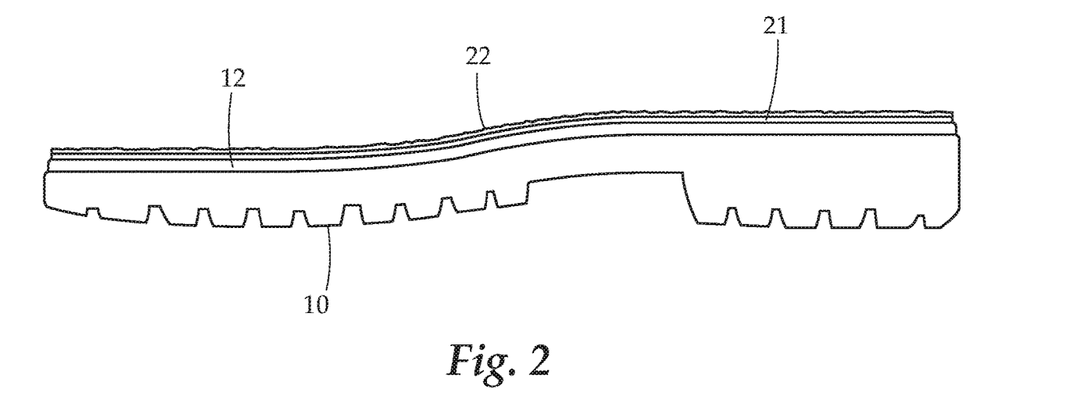
FIG. 2 provides a view of another embodiment of the present disclosure.

FIG. 2 shows a side view of another embodiment of the composite. In this view, rubber outsole 10 is bonded to the nonwoven fabric 12 in the same manner as disclosed in FIG. 1. On top of the nonwoven fabric 12 is a barrier material 21. As noted above, the barrier material 21 may vary and operates to prevent the rubber outsole 10 from fully passing through the nonwoven fabric 12 during curing/vulcanization. An adhesive 22 is applied to the top surface of the barrier 21 allowing it to be adhered to an upper or midsole of a shoe.

Figure 4:
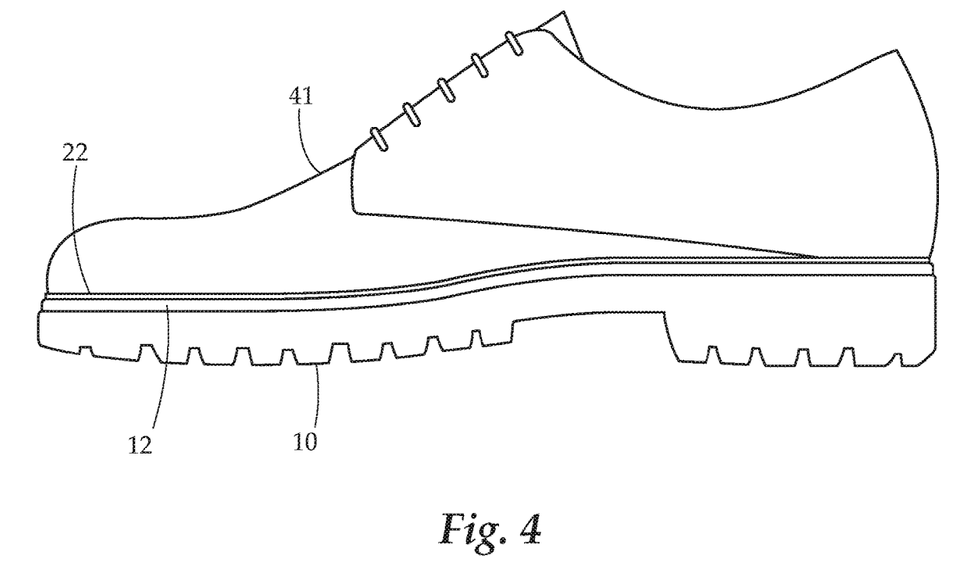
FIG. 4 provides a view of still another embodiment of the present disclosure.

FIG. 4 provides a view of an assembled shoe using the rubber composite of the present disclosure. Here, a shoe upper 41 is adhered to the outsole by an adhesive 22 which is adhered to the nonwoven fabric 12 and the upper 41. As in other embodiments, the rubber outsole 10 is directly mechanically bonded with the nonwoven fabric 12, and the nonwoven fabric in turn is adhered to the upper 41 via adhesive 22. In other embodiments (not shown), a midsole may be positioned between adhesive 22 and upper 41, such that the nonwoven fabric 12 bonds to this midsole instead of the upper 41. Midsole can then be adhered to the upper using another layer of adhesive.

Figure 5:
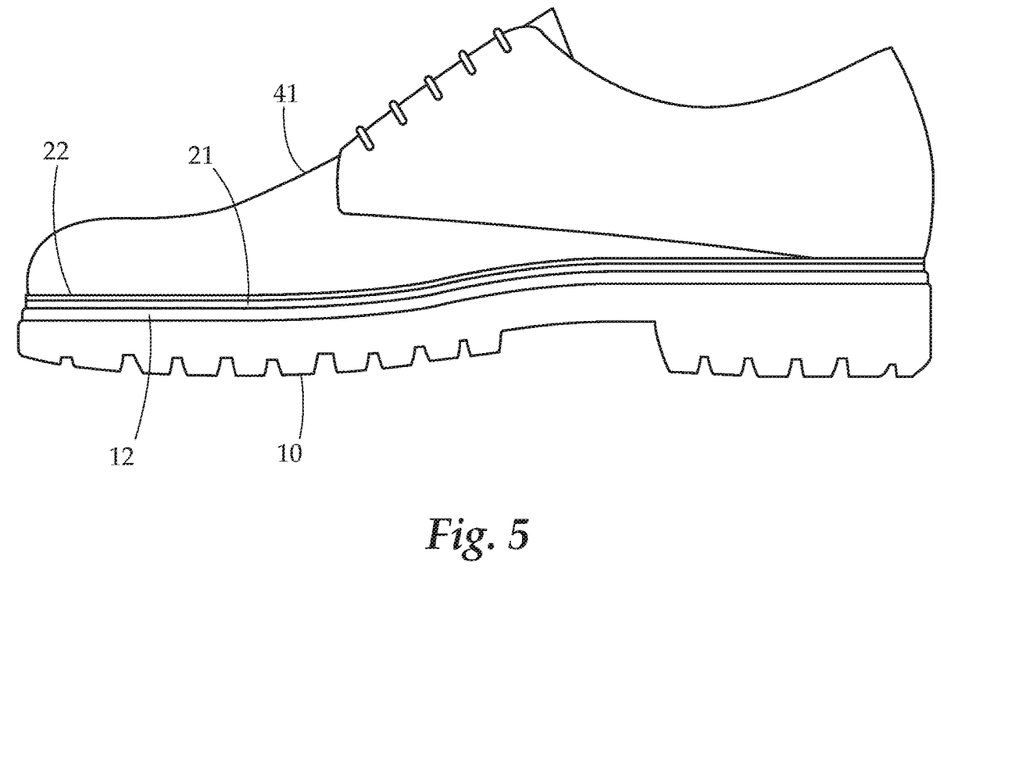
FIG. 5 provides a view of yet still another embodiment of the present disclosure.

FIG. 5 provides a view of an assembled shoe using the rubber composite of the present disclosure. Here, a shoe upper 41 is adhered to the outsole by an adhesive 22 which is adhered to the barrier 12. The barrier 21 is in turn bonded to the nonwoven fabric 12 and the nonwoven fabric 12 is bonded to the outsole 10. This assembly is similar to the embodiment of FIG. 2, with an upper 41 bonded thereto. As in other embodiments, the rubber outsole 10 is directly mechanically bonded with the nonwoven fabric 12 during curing/bonding. The nonwoven fabric 12 is bonded with the barrier layer 21 and in turn adhesive binds the upper 41 to the barrier 21 via adhesive 22. In other embodiments (not shown), a midsole may be positioned between adhesive 22 and upper 41, such that the barrier 21 bonds to this midsole instead of the upper 41. Midsole can then be adhered to the upper using another layer of adhesive.

Figure 6:
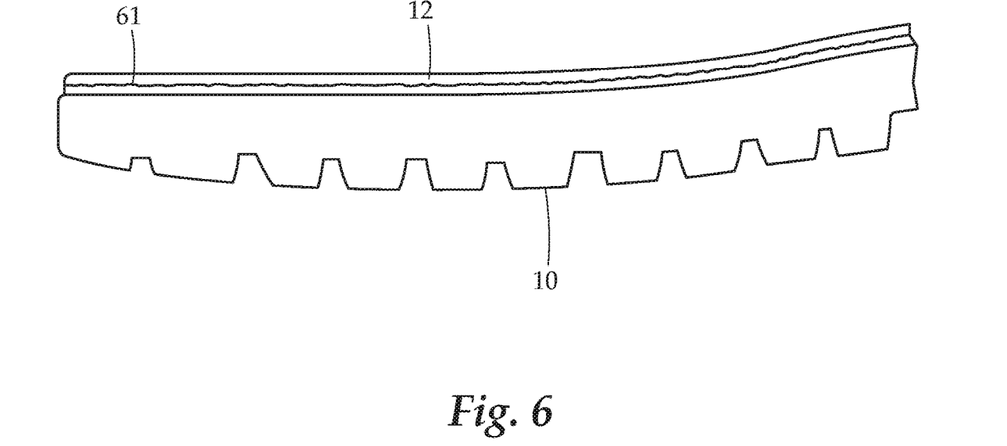
FIG. 6 provides a detail view of an embodiment of the disclosure.

FIG. 6 provides a detail view of the mechanical bonding between the outsole 10 and nonwoven fabric 12. As can be seen at interface 61, rubber has permeated, at least partially, into and around the fibers of the nonwoven fabric 12. This provides a mechanical and direct bonding of the two, without the use of adhesive.

Figure 7:
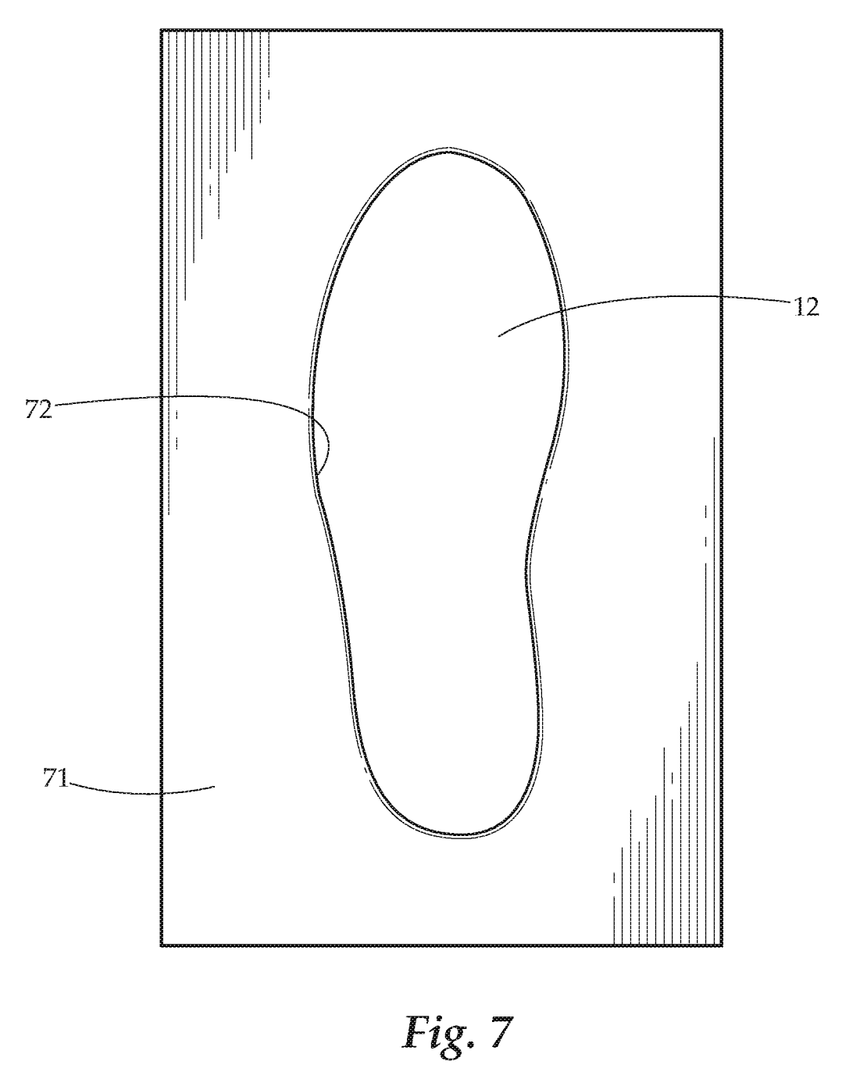
FIG. 7 provides view of an embodiment of the composition being formed in a mold.

FIG. 7 provides an elevation view of a mold into which rubber for the outsole and the non-woven composite may be positioned for molding and direct bonding. The mold 71 defines a sole shape 72. Rubber may be positioned in this sole shape 72 of the mold 71, and the nonwoven layer 12 (or nonwoven composite layer including a barrier and/or adhesive) can be positioned on top. The two can then be vulcanized/cured together, resulting in the multilayer composite of this disclosure.

Figure 8:
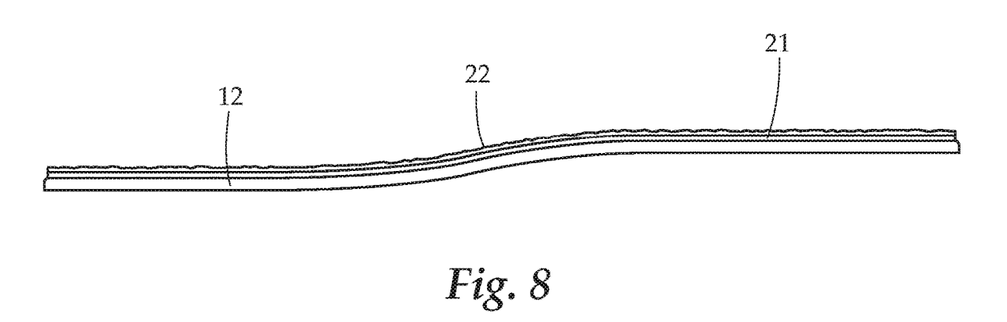
FIG. 8 provides a view another embodiment of the present disclosure.
Figure 9:
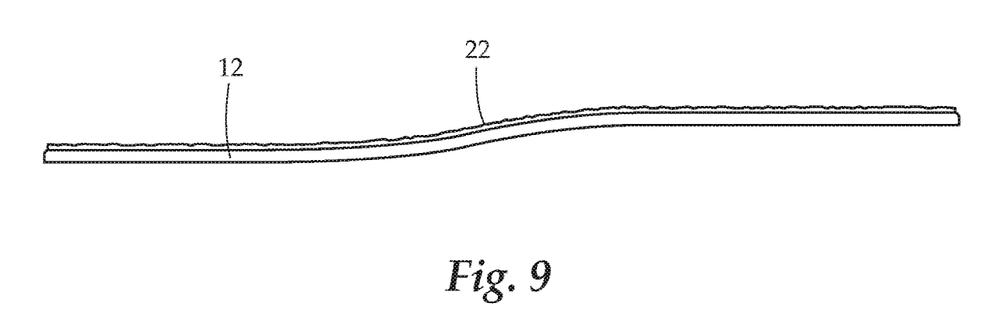
FIG. 9 provides a view of yet another embodiment of the present disclosure.

FIG. 8 provides a side view of an embodiment of the fabric having a barrier layer extruded thereon, and also having adhesive layer applied to the barrier opposite to the fabric layer. In this embodiment, the barrier material 21 is extruded onto the fabric layer 12. This causes the barrier 21 to directly bond to the fabric layer 12 because, when molten, the barrier seeps into the fabric layer 12 slightly, and once it hardens, is directly physically bound to the fabric layer 12. An adhesive 22 is also applied to the barrier 21 on a side opposite to the fabric 12. The adhesive 22 may be applied in an extrusion process, optionally at the same time that the barrier 21 is extruded onto the fabric 12. In other embodiments, adhesive 22 may be applied after the barrier 21 has been applied to the fabric 12 in a separate extrusion process, or by any other means of application. This two or three layer composite of fabric 12 and barrier 21, or fabric 12, barrier 21 and adhesive 22 may then be included into a mold with the rubber or other material for the outsole, and then vulcanized or cured in place, directly bonding the fabric 12 to the outsole. Typically, the composite of FIG. 8 will have a cross sectional shape matching a shoe sole to which it will be applied. However, in other embodiments, the embodiment may be formed in a large sheet, and the desired shape can be cut out of the sheet. FIG. 9 provides a view of a similar embodiment as that of FIG. 8, having the adhesive 22 directly applied to the fabric 12, omitting the barrier. As with embodiments of FIG. 8, adhesive 22 may be extruded directly onto the fabric layer 12, or may be applied using any other means.

Figure 10:
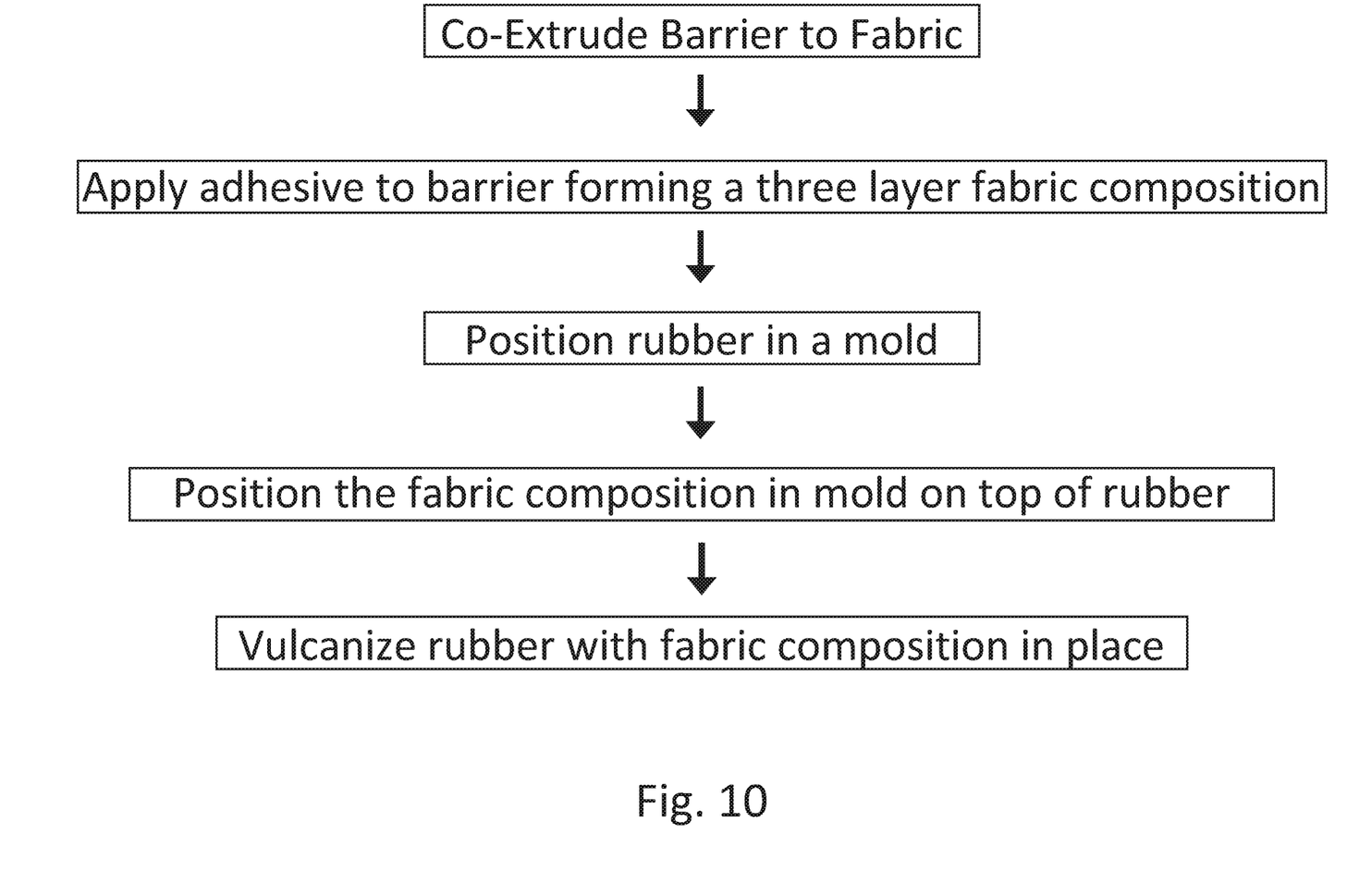
FIG. 10 provides an embodiment of a process of the present disclosure.

FIG. 10 provides a flow chart of a process of forming an embodiment of the rubber composite disclosed herein. This process involves extruding a barrier layer material to a fabric layer. As noted above, this extrusion process causes the barrier layer, in a molten state, to partially permeate into the fabric, and when the barrier layer material hardens to a solid state, the fabric is mechanically and directly bonded to the fabric. An adhesive is then applied to the barrier, on a side opposite to the fabric layer, forming a three layer fabric composition. As noted above, in other embodiments, the adhesive may alternatively be directly applied to the fabric layer. Adhesive may be applied at the same time, soon after, or long after the barrier is extruded to the fabric. Rubber may then be positioned in a mold for vulcanization, and the fabric layer so-formed may be positioned on top of the rubber in the mold. Of course in alternative embodiments this may be reversed, with the fabric composition in the bottom of the mold, with rubber on top. Side to side orientations are also possible, depending on mold configuration. The rubber with the fabric composition also in the mold is then vulcanized, forming a rubber and fabric composite.

Figure 11:
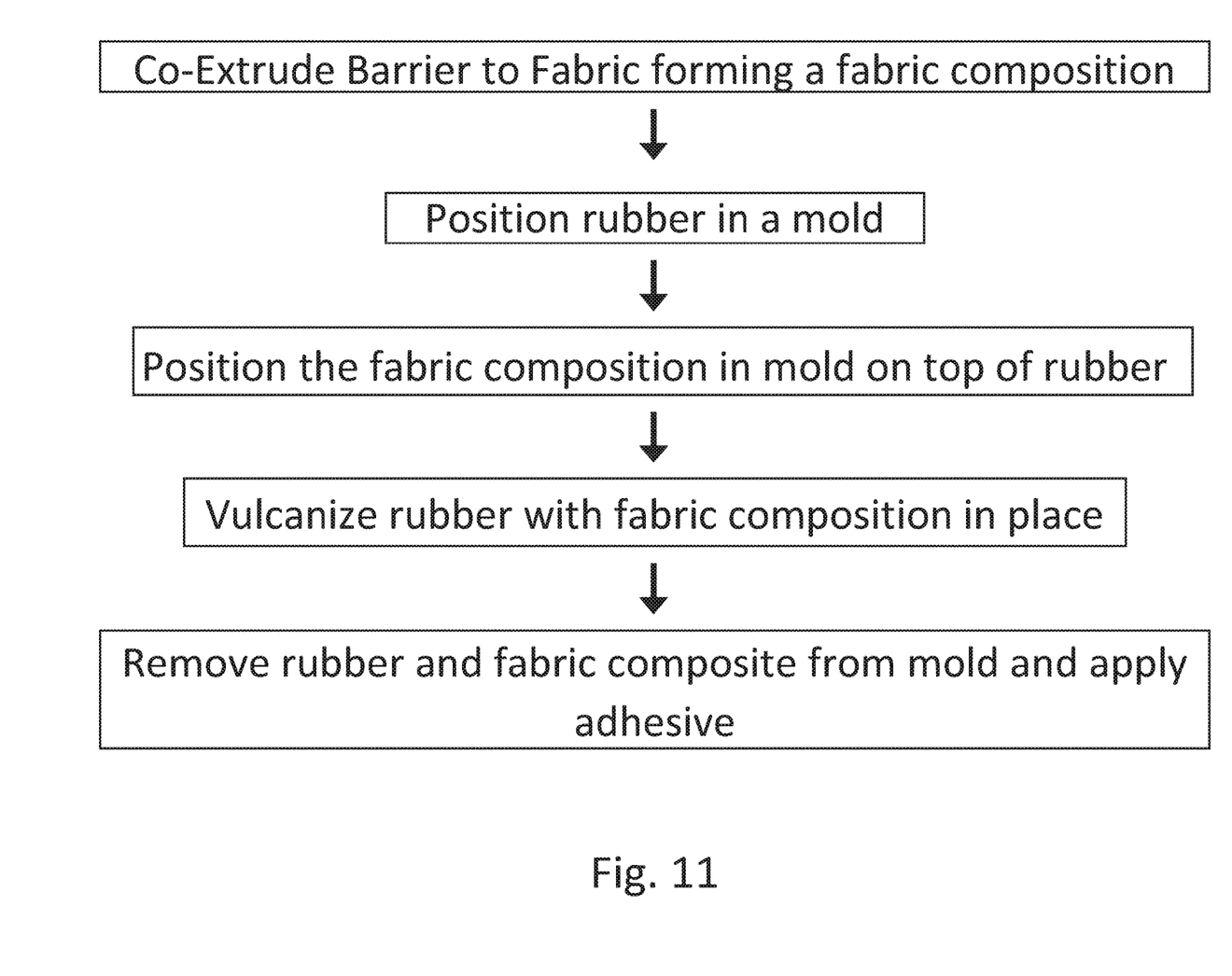
FIG. 11 provides another embodiment of another process of the present disclosure.

FIG. 11 provides a flow chart of a process of forming another embodiment of the rubber composite disclosed herein. This process involves extruding a barrier layer material to a fabric layer forming a fabric composition. As noted above, this extrusion process causes the barrier layer, in a molten state, to partially permeate into the fabric, and when the barrier layer material hardens to a solid state, the fabric is mechanically and directly bonded to the fabric. Rubber may then be positioned in a mold for vulcanization, and the fabric layer so-formed may be positioned on top of the rubber in the mold. Of course in alternative embodiments this may be reversed, with the fabric composition in the bottom of the mold, with rubber on top. Side to side orientations are also possible, depending on mold configuration. The rubber with the fabric composition also in the mold is then vulcanized, forming a rubber and fabric composite. Vulcanization directly binds the fabric to the rubber by way of the rubber, pre-vulcanization, permeating into the fabric, and being hardened during vulcanization. After this vulcanization and direct bonding, in this embodiment, the rubber and fabric composite is removed from the mold and an adhesive is applied after removal.

Figure 12:
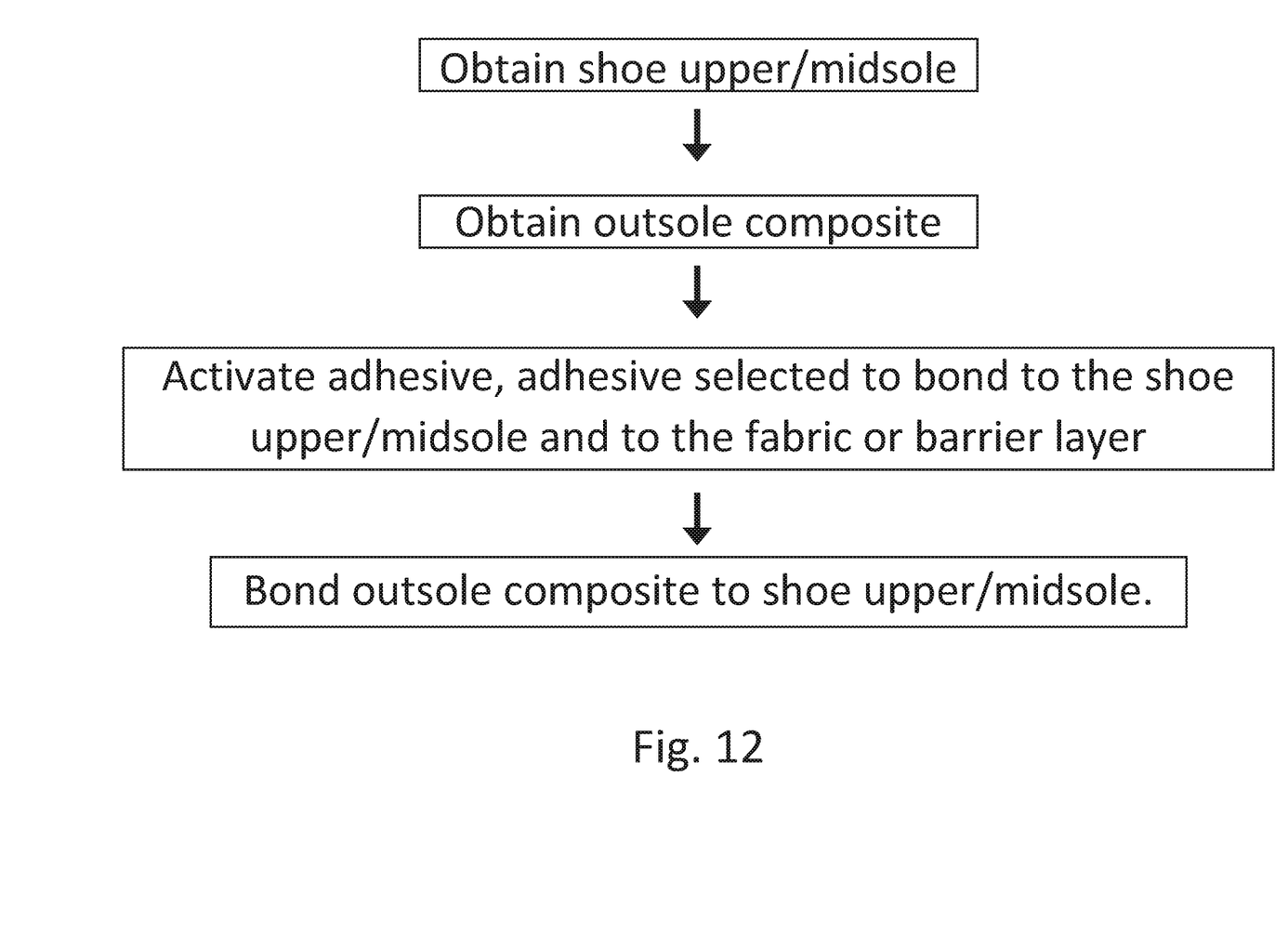
FIG. 12 provides yet another embodiment of another process of the present disclosure.

FIG. 12 provides a flow chart of a process of making a shoe using the rubber composite of the present disclosure. The process involves obtaining a shoe upper and/or midsole to and obtaining a rubber outsole composite as described in various embodiments herein. An adhesive of the rubber outsole composite is activated (made tacky) by, for example, heating, removing a contact paper, pressure sensitivity, and the like. This adhesive is selected to bond to the shoe upper/midsole material, and also to bond to the fabric or barrier layer of the rubber outsole composite. Examples of various adhesives are provided above. The outsole composite is then bonded to the shoe upper/midsole and the shoe can then be completed or further processed towards completion as a finished product.

Figure 13:
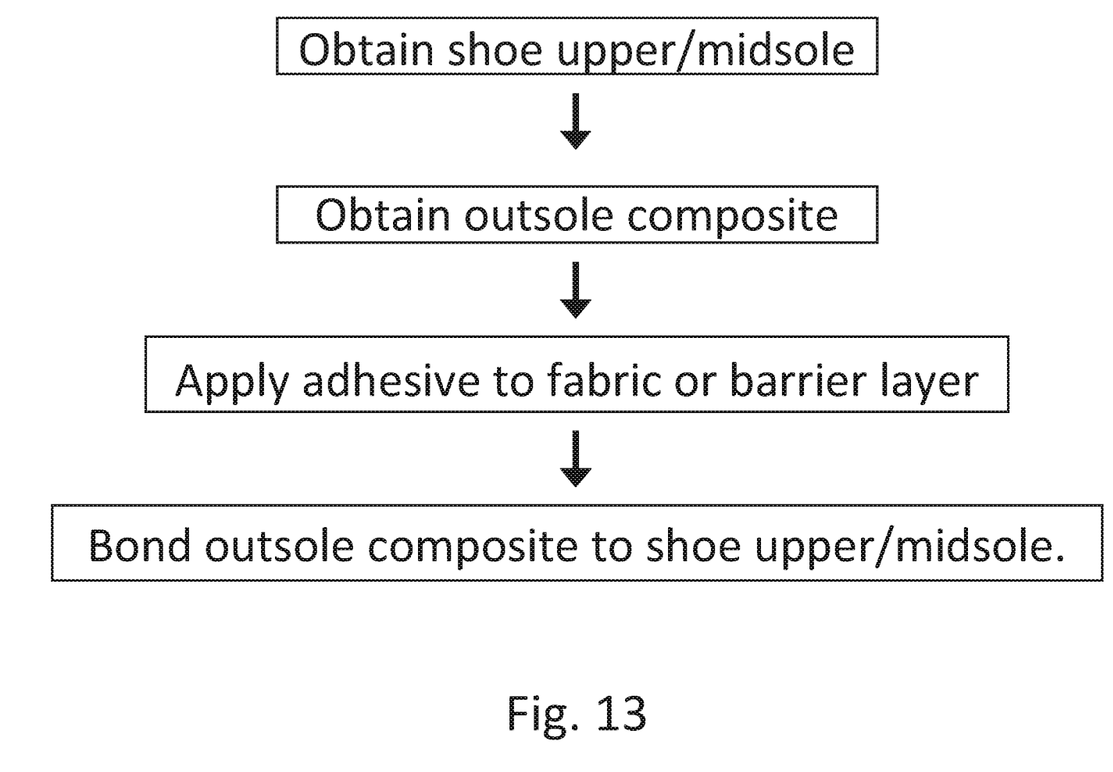
FIG. 13 provides still another embodiment of another process of the present disclosure.

FIG. 13 provides a flow chart of a process of making a shoe using the rubber composite of the present disclosure. The process involves obtaining a shoe upper and/or midsole to and obtaining a rubber outsole composite as described in various embodiments herein. An adhesive is then applied to the fabric or barrier layer of the rubber outsole composite, and then this adhesive is bonded to the shoe upper/midsole before it dries after application. The shoe can then be completed or further processed towards completion as a finished product.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth. It is further to be understood that various aspects and embodiments may include elements and/or components that are similarly and equally applicable and/or interchangeable with other aspects and embodiments, without being limited to the particular aspect or embodiment to which they are described.

What is claimed is:

1. A method of forming a rubber outsole composite comprising the steps of:

placing a quantity of rubber in a mold;

positioning a multi-layer composite in contact with the quantity of rubber in the mold, the multi-layer composite comprising a fabric material layer, and a barrier layer directly bonded to a second side of the fabric material layer, with a first opposite side of the fabric material layer contacting the rubber;

the barrier layer being formed of a material operable to prevent the rubber from passing through the fabric material layer before vulcanization;

the barrier layer being extruded onto the fabric material layer such that the barrier layer is partially permeated into the fabric such that the barrier layer is mechanically and directly bonded to the fabric material second side; and vulcanizing the rubber in the mold with the fabric material layer in position, the vulcanizing causing the fabric material layer to be directly mechanically bonded to the rubber, the multi-layer composite being in the mold during the vulcanizing step.

2. The method of claim 1 further comprising the step of extruding the barrier layer onto the second side of the fabric material layer.

3. The method of claim 1 further comprising the step of applying an adhesive layer to the barrier layer after the vulcanization step.

4. The method of claim 1 wherein the multi-layer composite further comprising an adhesive layer on a top surface of the barrier layer opposite to the fabric material layer, the adhesive layer being in the mold during the vulcanizing step.

5. The method of claim 1 further comprising the step of adhering an adhesive on a top surface of the barrier layer to one of a shoe upper or a shoe midsole.

* * * * *